United States Patent
Spink et al.

(10) Patent No.: US 7,106,504 B2
(45) Date of Patent: *Sep. 12, 2006

(54) ENHANCED SHUTTER CONTROL FOR IMAGES THAT ARE FADED INTO A STEREO MICROSCOPE

(75) Inventors: Roger Spink, Berneck (CH); Jacques Alain Déverin, deceased, late of Widnau (CH); by Olivier Déverin, legal representative, Münsingen (CH); Benno Moser, Berneck (CH); Jürgen Mannss, Oberdiessbach (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/474,709

(22) PCT Filed: Apr. 4, 2002

(86) PCT No.: PCT/EP02/03748

§ 371 (c)(1),
(2), (4) Date: Jul. 8, 2004

(87) PCT Pub. No.: WO02/084365

PCT Pub. Date: Oct. 24, 2002

(65) Prior Publication Data

US 2005/0088732 A1 Apr. 28, 2005

(30) Foreign Application Priority Data

Apr. 12, 2001 (DE) .............................. 101 18 703

(51) Int. Cl.
G02B 21/18 (2006.01)
G02B 21/00 (2006.01)
G02B 21/22 (2006.01)

(52) U.S. Cl. ................. 359/372; 359/368; 359/376
(58) Field of Classification Search ........ 359/368–381, 359/385–389, 618, 630
See application file for complete search history.

(56) References Cited

U.S. PATENT DOCUMENTS

| 5,095,887 | A | * | 3/1992 | Leon et al. ................. 600/166 |
| 5,601,549 | A | | 2/1997 | Miyagi ........................ 606/4 |
| 5,835,264 | A | * | 11/1998 | Tandler et al. ............. 359/377 |
| 6,081,371 | A | | 6/2000 | Shioda et al. .............. 359/372 |
| 6,661,572 | B1 | * | 12/2003 | Spink et al. ................ 359/372 |
| 6,765,718 | B1 | * | 7/2004 | Spink et al. ................ 359/372 |
| 2001/0010592 | A1 | | 8/2001 | Nakamura .................. 359/376 |

FOREIGN PATENT DOCUMENTS

| DE | 100 21 063 A1 | 12/2000 |
| DE | 10021063 A | 12/2000 |
| EP | 0 928 981 A2 | 7/1999 |
| EP | 0 712 600 B1 | 1/2001 |
| JP | 2001-046399 A | 2/2001 |
| JP | 2001046399 A | 2/2001 |
| WO | WO 00/68724 A1 | 11/2000 |
| WO | WO-0068724 A | 11/2000 |

* cited by examiner

*Primary Examiner*—Thong Q. Nguyen
(74) *Attorney, Agent, or Firm*—Hodgson Russ LLP

(57) ABSTRACT

The invention relates to a stereo microscope, which as a microscope used for operations comprises a viewing output for a surgeon (41) and at least one additional viewing output for an assistant (40). The stereo microscope is characterized by shutters (17a to 20b) for selectively screening off object information.

7 Claims, 3 Drawing Sheets

ENHANCED SHUTTER CONTROL FOR IMAGES THAT ARE FADED INTO A STEREO MICROSCOPE

CROSS-REFERENCE TO RELATED APPLICATIONS

The present application is the U.S. National Stage of International Application No. PCT/EP02/03748 filed Apr. 4, 2002, which claims priority of German Application No. 101 18 703.3 filed Apr. 12, 2001.

FIELD OF THE INVENTION

The invention relates to shutter control for the integration of additional data into an observation beam path or a plurality of observation beam paths of a stereo microscope, for selectively switching off an undesired observation channel.

DESCRIPTION OF THE RELATED ART

In modern surgical microscopes, it is customary to insert additional information into one of the two intermediate images. This additional information is either superimposed directly on the optical object image (e.g., correlated data, CT, MRI-contours) or displayed without reference to the optical object image (non-correlated image data, standard sections, etc.), by stopping the relevant object beam or by superimposing it in a limited subregion (monitoring curves, menus, etc.).

In the case of fading out the object beam, a shutter is moved into the object beam path between the object and the beam splitter which inserts the additional information, so that only the additionally inserted information can be seen. In case a number of users are to be permitted to observe the additional information by utilizing the further course of the beam, the merge of the beams is created by the first beam splitter (such as e.g. 11$b$ in FIG. 1). In surgical microscopes, a distinction is to be drawn in principle with regard to their functions between three different types of observers:

1) A surgeon, who almost exclusively uses the observation outputs 21$a$ and 21$b$ stereoscopically, generally decides as to the type and time of the input reflection of the additional information;
2a) An assistant almost exclusively uses either the right-hand observation output 20$b$ (as in FIG. 6) or the left-hand observation beam path 20$a$ (as in FIG. 7) monoscopically, when he/she is standing at right angles to the surgeon 41 and the microscope (such as in craniotomy) or
2b) the assistant 40 uses the observation beam path 20$a$ and 20$b$ is used stereoscopically when the assistant 40 stands opposite the surgeon 41 and behind the microscope, as illustrated in FIG. 5 (such as in spinal operations).
3) An observer group, that is beside the microscope, is intended to see substantially that information on a monitor which the surgeon 41 sees.

In the "observer"-case 1 based the additional information in a single image channel, in particular in the case of data substitution by the insertion of video data, for example, into this image channel, the surgeon 41 is provided with two different items of information, which may irritate him/her.

BRIEF SUMMARY OF THE INVENTION

It is therefore a central object of the present invention to eliminate the aforementioned disadvantages and to allow the surgeon to switch off object information which is not desired at a certain time by using additional shutters and an appropriate shutter control.

By means of additional shutters at the observation outputs (the oculars), the observer, if desired, can concentrate on just the additional information reflected into an observation beam path.

BRIEF DESCRIPTION OF THE SEVERAL VIEWS OF THE DRAWINGS

For further explanation see the Figures, wherein the FIGS. 1–4 are schematic illustrations of various embodiments of the present invention showing shutter positions.

DETAILED DESCRIPTION OF THE INVENTION

Figure 1:
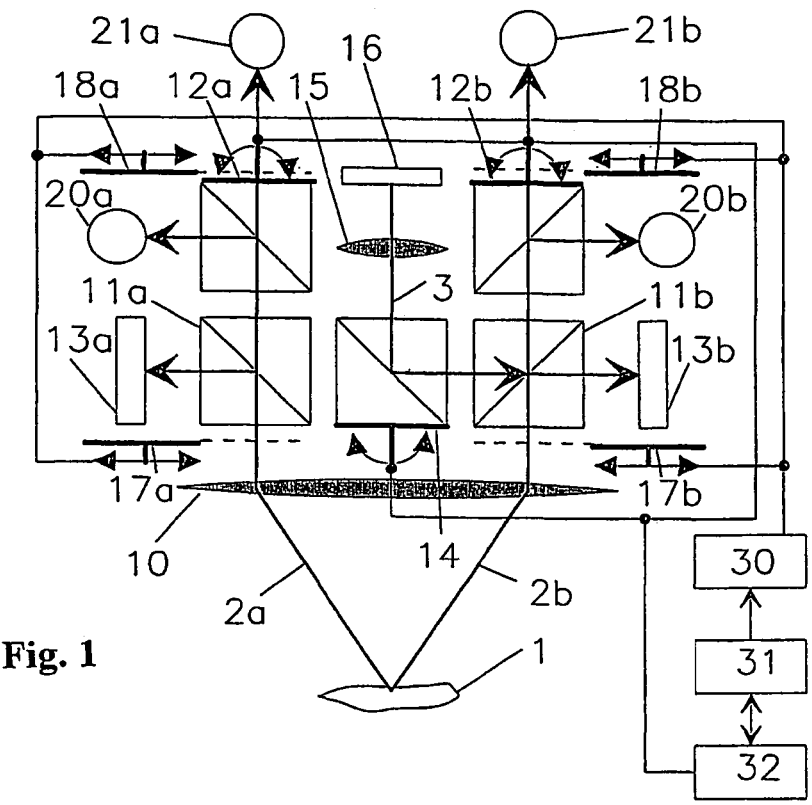

In FIG. 1, a display 16 projects an image provided with additional information along the common input reflection beam path 3 for the additional information and into the right-hand beam path 2$b$ by means of a lens 15 and a switchable or movable deflection prism 14 (which may be switched for projection into the left-hand beam path 2$a$ or the right-hand beam path 2$b$). By means of the input reflection beam splitter 11$b$, this additional information may be superimposed on the image of the object 1 supplied to the optional image sensor 13$b$ and other observation beam paths).

Figure 2:
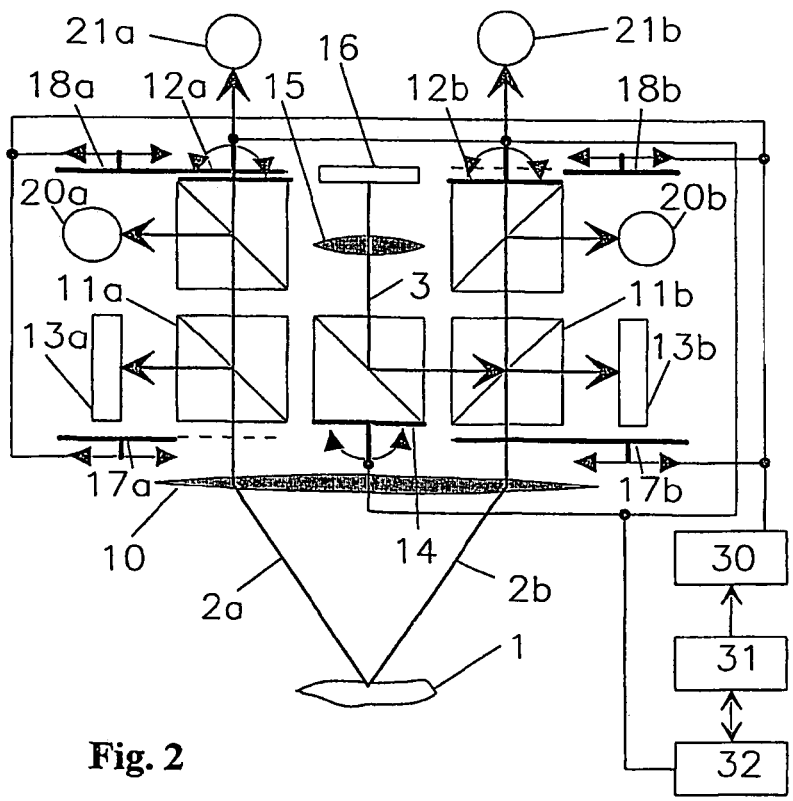

By means of the shutters 18$a$ and 18$b$, the observer, if desired, can concentrate on just the additional information. In FIG. 2 the additional information is switched to the right-hand beam path 2$b$. Because shutter 18$a$ is closed, the surgeon 41 sees only the additional information with the right eye. The left eye does not see anything.

The assistant observation outputs 20$a$, 20$b$ may likewise be switched either to the two lateral monoscopic outputs or to the rear stereoscopic output, depending on the surgical intervention.

In a cranial intervention an assistant 40 positioned on the left-hand side sees the object information monoscopically through the left-hand observation output 20$a$, but does not see the additional information; an assistant 40 positioned on the right-hand side perceives only the additional information monoscopically through the right-hand observation output 20$b$.

In a spinal intervention the assistant 40 perceives both items of information stereoscopically through the outputs 20$a$ and 20$b$. He/she therefore also sees both items of information with differing content.

Particular surgeons' preferences can be stored in the controller 31 and called up for use. For example, one surgeon always likes to see both items of information at the same time (in which case the shutters 18$a$ and 18$b$ always remain open), while another surgeon only likes to see the additional information (in which case, depending on the position of the prism 14, the shutter controller 30 closes shutter 18$a$ or 18$b$).

Figure 3:
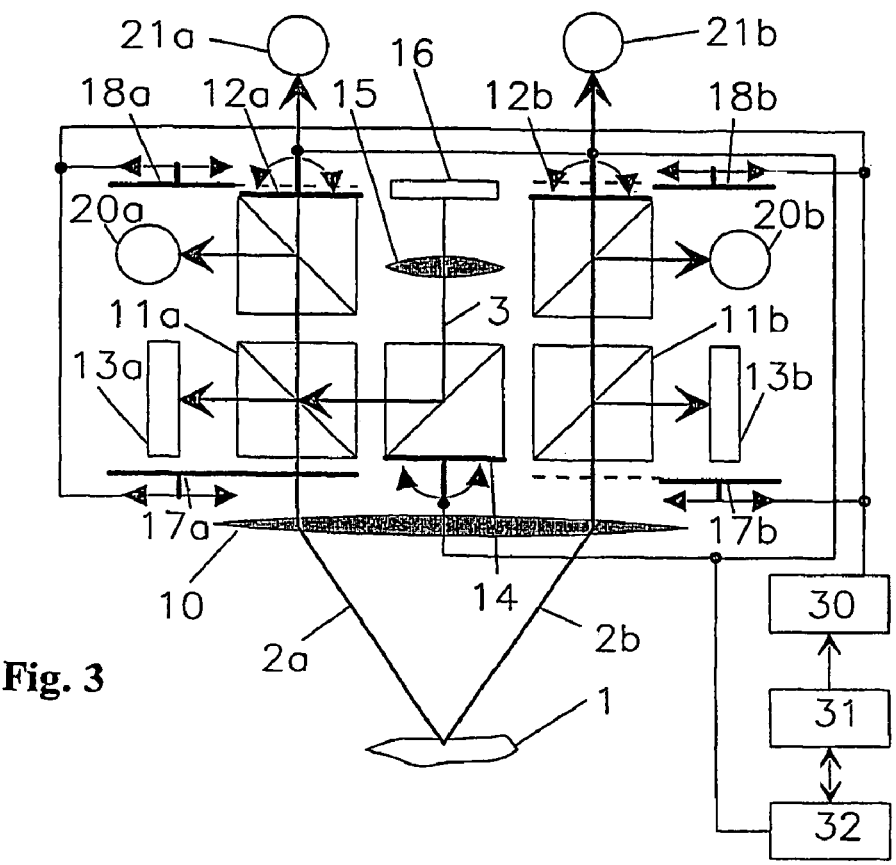

FIG. 3 shows the setting with inserted additional information in the left-hand beam path 2a with shutters 17b, 18a, 18b open.

Figure 4:
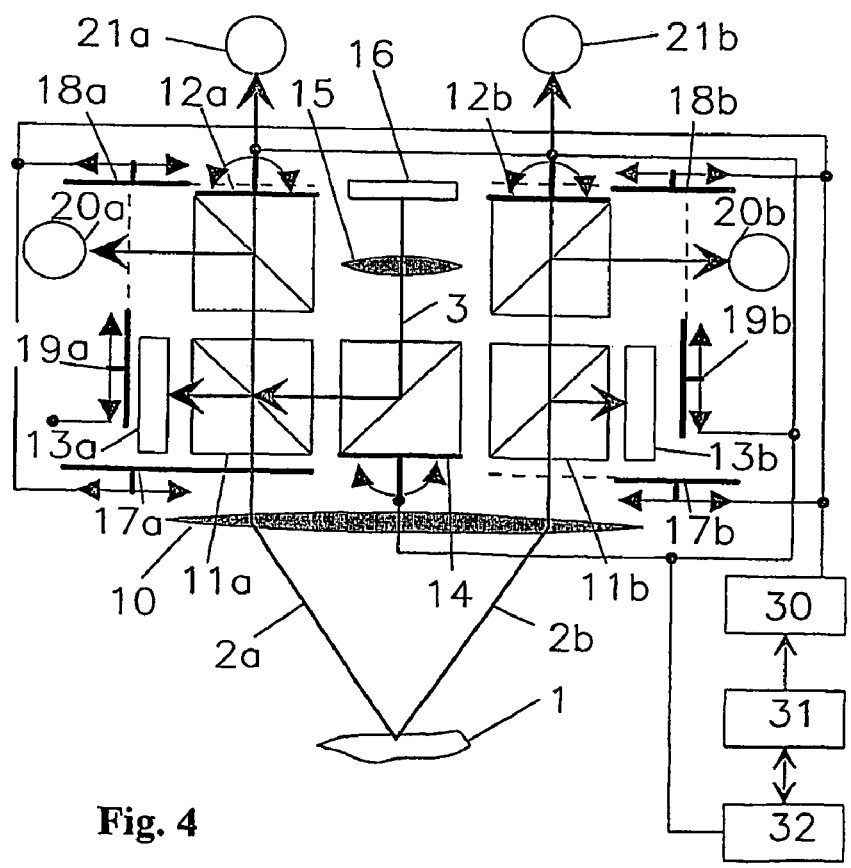
Figure 5:
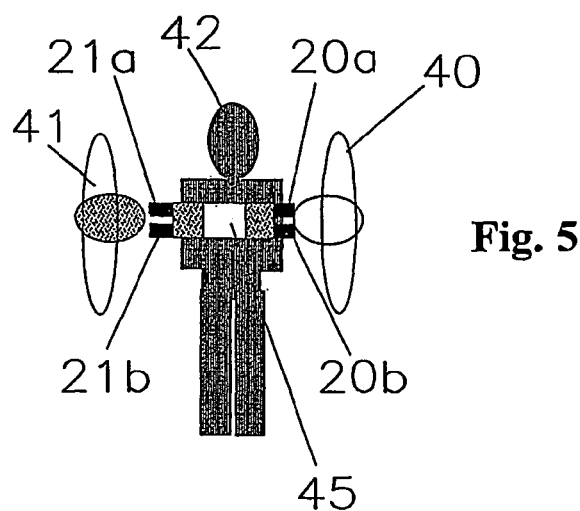
FIGS. 5–7 illustrate the known positioning variants of the surgeon and the assistant with respect to the patient being observed.
Figure 6:
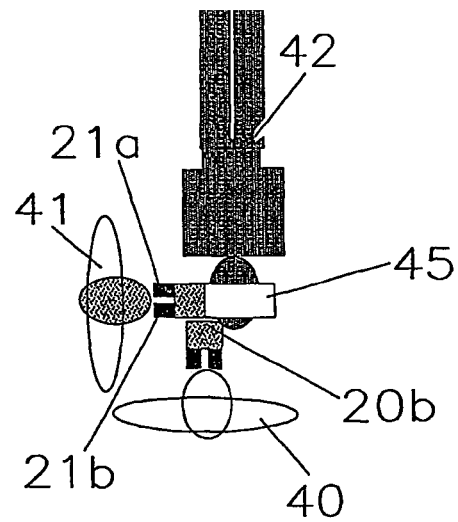
Figure 7:
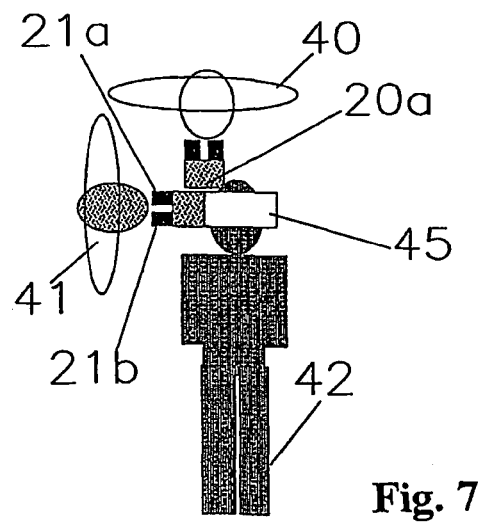

FIG. 4 illustrates the arrangement of the shutters for the assistant observation outputs 20a, 20b. These are essentially the shutters 19a and 19b, one of which may be closed if an assistant 40 is positioned behind (such as in a spinal arrangement).

The invention provides at least the following advantages:
selectively switching off an object image which is temporarily undesired or which distracts the surgeon 41;
providing the assistant 40 with an image of the object 1 in any application;
enabling a connected camera system to always detect the object 1;
and automatically adapting the shutter positions depending on the additional information.

LIST OF DESIGNATIONS

1 Object (patient)
2a Object beam, left-hand beam path
2b Object beam, right-hand beam path
3 Input reflection beam path for additional information
10 Main objective
11a Input reflection beam splitter for left-hand beam path, video and additional information
11b Input reflection beam splitter for right-hand beam path, video and additional information
12a Output reflection beam splitter for left-hand beam path, first and second observer
12b Output reflection beam splitter for right-hand beam path, first and second observer
13a Video image sensor for left-hand beam path
13b Video image sensor for right-hand beam path
14 (Switchable) deflection prism (additional information beam path)
15 Lens imaging objects for (16)
16 Display for additional information
17a Switchable first shutter for stopping the object light in the left-hand beam path
17b Switchable first shutter for stopping the object light in the right-hand beam path
18a Switchable second shutter for stopping the object light in the left-hand beam path
18b Switchable second shutter for stopping the object light in the right-hand beam path
19a Switchable third shutter for stopping the object light in the left-hand assistant beam path
19b Switchable third shutter for stopping the object light in the right-hand assistant beam path
20a Secondary observation output (assistant output) for monocular observer (40), left
20b Secondary observation output (assistant output) for monocular observer (40), right
21a Main observation output for stereo observation for (41), left-hand beam path
21b Main observation output for stereo observation for (41), right-hand beam path
30 Shutter controller (for detecting the position or setting and/or for controlling the shutters)
31 Controller for data-type information with memory and user setup
32 Control and sensors of the rotation prisms (for detecting the position or setting and/or for controlling the prisms)
40 Assistant
41 Surgeon
42 Patient
45 Lens holder

What is claimed is:

1. A stereo microscope comprising:
a pair of observation beam paths;
a pair of main observation outputs respectively associated with the pair of observation beam paths;
a beam splitter in one of the pair of observation beam paths for reflecting additional information into the corresponding observation beam path in which the beam splitter is located;
a first shutter located in front of the beam splitter in the corresponding observation beam path for selectively switching off object information in the corresponding observation beam path; and
a second shutter located in front of the main observation output in the corresponding observation beam path for selectively switching off object information and additional information in the corresponding observation beam path.

2. The stereo microscope according to claim 1, wherein there are two of the beam splitter, two of the first shutter, and two of the second shutter, each of the pair of observation beam paths having one of the two beam splitters, one of the two first shutters, and one of the two second shutters therein.

3. The stereo microscope according to claim 2, further comprising a sensor for detecting which of the pair of observation beam paths additional information is reflected into and a shutter control device connected to the sensor, wherein the shutter control device is configured to open and close at least one of the first shutter and the second shutter on the basis of an operator-specific or an application-specific instruction and output from the sensor.

4. The stereo microscope according to claim 1, further comprising a shutter control device configured to open and close at least one of the first shutter and the second shutter on the basis of an operator-specific or an application-specific instruction.

5. A stereo microscope comprising:
a pair of observation beam paths;
a pair of main observation outputs respectively associated with the pair of observation beam paths;
a pair of secondary observation outputs for respectively viewing information split out of the pair of observation beam paths;
a beam splitter in one of the pair of observation beam paths for reflecting additional information into the corresponding observation beam path in which the beam splitter is located;
a first shutter located in front of the beam splitter in the corresponding observation beam path for selectively switching off object information in the corresponding observation beam path;
a second shutter located in front of the main observation output in the corresponding observation beam path for selectively switching off object information and additional information in the corresponding observation beam path; and
a third shutter located in front of the secondary observation output associated with the corresponding observation beam path for selectively switching off object information and additional information split out of the corresponding observation beam path.

6. The stereo microscope according to claim 5, wherein there are two of the beam splitter, two of the first shutter, two of the second shutter, and two of the third shutter, each of the pair of observation beam paths having one of the two beam splitters, one of the two first shutters, one of the two second shutters, and one of the two third shutters therein.

7. A stereo microscope according to claim 6, further comprising a pair of rotatable assistant prisms one in each of the pair of observation beam paths for adjusting the position of the pair of secondary observation outputs relative to the pair of main observation outputs, and a control device which detects the current rotational position of the assistant prisms and controls the first, second, and third shutters based on the detected rotational position.

* * * * *